(12) United States Patent
Agrawal et al.

(10) Patent No.: US 6,928,445 B2
(45) Date of Patent: Aug. 9, 2005

(54) COST CONVERSANT CLASSIFICATION OF OBJECTS

(75) Inventors: Dashi Agrawal, Monsey, NY (US);
David P. Olshefski, Danbury, CT (US);
Dinesh C. Verma, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 10/180,711

(22) Filed: Jun. 25, 2002

(65) Prior Publication Data

US 2003/0236789 A1 Dec. 25, 2003

(51) Int. Cl.[7] ............................................. G06F 17/30
(52) U.S. Cl. ...................................... 707/101; 707/10
(58) Field of Search ..................... 707/1–10, 100–104.1, 707/200–205

(56) References Cited

U.S. PATENT DOCUMENTS 6,138,123 A * 10/2000 Rathbun ..................... 707/201
6,377,945 B1 * 4/2002 Risvik ........................... 707/3

* cited by examiner

Primary Examiner—Mohammad Ali
(74) Attorney, Agent, or Firm—Thomas A. Beck; Louis P. Herzberg

(57) ABSTRACT

The present invention provides methods, apparatus and systems for cost conversant classification of objects. In order to achieve this, we create an efficient tree structure to store different classification rules. The methods particularly relate to objects with multiple attributes and classification rules that are defined in terms of these attributes. The techniques can handle rules that can be represented as a single or multiple hypercubes in attribute space. Furthermore, the present techniques are effective when the number of relevant object attributes are large and no specialized classification hardware is accessible. Such methods can be used in various applications such as classification of web sessions in an e-commerce application, classification of connection request in TCP connections etc.

34 Claims, 8 Drawing Sheets

Fig. 2a: Search Tree Structure

Fig. 2b: Internal Node Structure

Fig. 2c: Leaf Node Structure

COST CONVERSANT CLASSIFICATION OF OBJECTS

FIELD OF THE INVENTION

The present invention is directed to computer e-commerce applications. It is more particularly directed to object classification.

BACKGROUND OF THE INVENTION

In a number of e-commerce applications, objects with multiple attributes need to be classified, using a given set of rules, as efficiently as possible. For example, an HTTP request may be classified based on the source-address, destination-address, host server, and the name of the file it requests. An e-commerce application may want to give priority to all HTTP service requests from Company 'X' to Company 'Y' that request global sales-updates. An IP packet may be classified based on its five-tuple.

Previously, attention was focused toward packet classification in the context of internet routers. This deals with the fast classification of IP packets based on values of the 5-tuple (source address, destination address, source port, destination port, and protocol) in the IP packet header. These methods exploit properties of IP routes, semantics of the actual databases of rules, and properties of specific hardware implementations to expedite the classification. They also use certain efficient data structures to store classification rules and fasten computations. These methods however do not deal with the problem of objects whose attributes lie in a arbitrarily large dimension. These algorithms also presumes availability/capability of tailored hardware solutions. Thus, these algorithms are limited in that they work in limited number of dimensions; do a limited classification; exploit properties of hardware; and do not consider that different rules could imply different cost etc.

SUMMARY OF THE INVENTION

One aspect of the present invention is to provide methods for object classification used to classify any object having multiple attributes.

Another aspect of the present invention is to perform object classification which is cost conversant. This takes into account different cost weights of different rules using an uncertainty based method to construct object data structures.

Still another aspect of the present invention is to provide further methods, apparatus and systems to handle, resolve and execute classification of these objects having multiple attributes.

Another aspect of the present invention is to provide methods, apparatus and systems for cost conversant classification of objects which can further take into account different cost weights of different rules.

BRIEF DESCRIPTION OF THE DRAWINGS

These and other objects, features, and advantages of the present invention will become apparent upon further consideration of the following detailed description of the invention when read in conjunction with the drawing figures, in which.

DEFINITIONS OF TERMS

Figure 1:
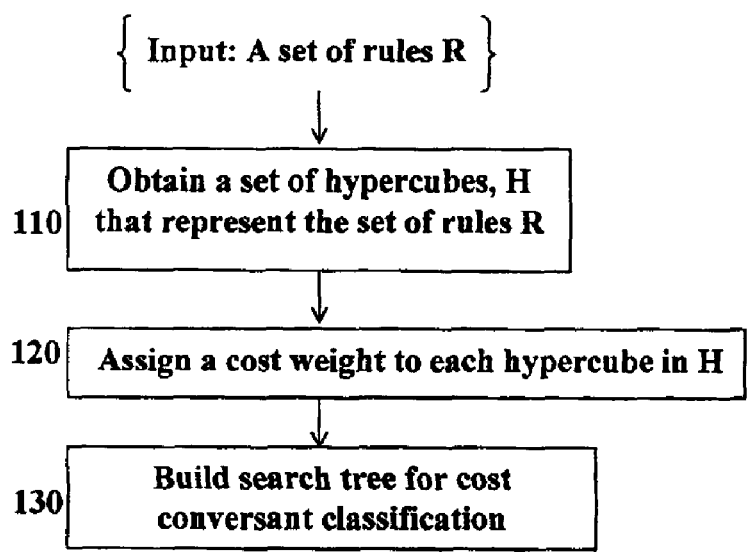
FIG. 1 is an example illustration of a method for building a search tree for cost conversant classification of objects.

The following are definitions of terms as used herein:

Multidimensional attribute space: A multidimensional space is a space where each dimension represents an attribute. If a multidimensional attribute space has 'D' dimensions, it is referred to as a D-dimensional space and is defined by a D-tuple of ranges:

$$<[L_1^{min}, U_1^{max}], [L_2^{min}, U_2^{max}] \ldots , [L_D^{min}, U_D^{max}],>$$

Where, $L_k^{min}$ is the lower bound of the space in dimension 'k' and $L_k^{max}$ is the upper bound of the space in dimension 'k'.

Cost Weight: Cost weight of a region in D-dimensional space represents a cost of that region. For example, it could be an area of the region, or it could be a fee paid by a user if its attributes fall in the region, etc.

Hypercube: A hypercube is a D-tuple of ranges $<[L_1, U_1], [L_2, U_2], \ldots , [L_D, U_D],>$ that define a subspace within the D-dimensional space.

Weighted Hypercube: A weighted hypercube is a hypercube with a cost weight associated with it.

Rule: A rule fully defines a weighted hypercube in the D-dimensional space. Thus a rule can be represented as a 2-tuple consisting of weight and hypercube:

$$\text{Rule} = [\text{weight}, <[L_1, U_1], [L_2, U_2] \ldots , [L_D, U_D]>]$$

Selector Attributes: Selector attributes are the attributes represented by each dimension of a D-dimensional space.

Object: An object is an entity including an abstract, virtual, physical, and/or real entity that has a vector of 'D' selector attributes;

Classification: Classification of an object includes finding at least one rule, among a given set of rules, which is satisfied by the object. Note that an object is said to satisfy a rule if and only if the values of all its attributes are included within the hypercube defined by the rule. Thus, an object with a vector of 'D' selector attributes, $[x_1, x_2, \ldots , x_D]$, satisfies a rule, wherein the rule is given by, $$\text{Rule} = [\text{weight}, <[L_1, U_1], [L_2, U_2] \ldots , [L_D, U_D]>]$$

if and only if the following is true, $L_1 \leq x_1 \leq U_1$ $L_2 \leq x_2 \leq U_2$ $\ldots$ $L_D \leq x_D \leq U_D$ Search Tree: A search tree is an abstract graph structure whose nodes and links form a tree shape.

Node: A node is an entity in the search tree used during classification. A node may or may not have children. All nodes in the search tree have an associated set of rules.

Root Node: A root node is a node at the root of the search tree.

Leaf Node: A leaf node in the search tree does not have children nodes. Leaf nodes include a set of rules (See FIG. 2c.)

Leaf Node=<{$R_1, R_2, \ldots$}>

Interior Node: An interior node is a node in a search tree that has children nodes. Each interior node in the search tree includes a value 'd' representing a decision dimension in D-dimensional space and a splitting threshold value 't' such that $t \subset [L_d^{min}, U_d^{max}]$. Both 'd' and 't' taken together are referred to as the partition of the node. An interior node also includes pointers to its child nodes (See FIG. 2b).

Interior Node=<d,t,{$R_i, R_j, \ldots$}, Lchild, Rchild>

Partition of a Range: A partition $P_r$ of a range 'r' in dimension 'k' is a set of I non-overlapping ranges whose union is equal to the range r, $P_r = \{[L_k, U_k]^1, [L_k, U_k]^2, \ldots, [L_k, U_k]^I\}$ such that $[L_k, U_k]^i \cap [L_k, U_k]^j = \phi$ and $r = [L_k, U_k]^1 \cup [L_k, U_k]^2 \cup \ldots \cup [L_k, U_k]^I = [L_k^{min}, U_k^{max}]$ where:

$L_k^{min} = MIN\{L_k^1, L_k^2, \ldots, L_k^I\}$ $U_k^{max} = MAX\{U_k^1, U_k^2, \ldots, U_k^I\}$ Marginal Weight Distribution: Given a set of rules, {$R_1, R_2, \ldots, R_n$}, in D-dimensional space, and $P_r$, a partition in dimension 'k', a marginal weight distribution (MWD) can be computed for $P_r$. The marginal weight distribution assigns relative cost weights to each interval in $P_r$.

Since we use the concept of marginal weight distribution frequently in this patent, we will now give examples of procedures that can be employed to computed such weight distribution. For example, given a set of rules whose cost weights are known, the relative cost weight of an interval in $P_r$ is equal to the sum of the cost weights of the rules that intersect with that interval in dimension 'k'.

In another example, given a set of rules whose cost weights are known, the relative cost weight of an interval in $P_r$ is equal to the sum of the fractional cost weights of the rules that intersect with that interval in dimension 'k'. The fractional cost weight of a rule is defined as the cost weight of rule divided by the number of intervals in $P_r$ that the rule intersects in dimension 'k'. As a further example of computing marginal weight distribution consider a set of rules with initially unknown cost weights, the cost weight of an interval in $P_r$ is equal to the relative frequency at which an object's attribute in dimension 'k' falls within that interval. Thus this procedure can be used to dynamically adjust the cost weight of rules during classification.

DETAILED DESCRIPTION OF THE INVENTION

The present invention, provides methods, apparatus and systems for building a search tree for a given set of rules. Given an object, the search tree then provide a cost conversant way of finding the rules satisfied by the object. FIG. 1 shows an embodiment of a method of constructing a search tree starting from a set of rules. The first step 110 in this process is to obtain a set of hypercubes which represent the set of rules. Step 110 includes decomposing a region in a multidimensional space into at least one hypercube. For example, a region corresponding to paying customers may be further decomposed into two hypercubes corresponding to premium and regular customers. In some embodiments, step 110 also includes combining hypercubes which result in a similar classification into a composite hypercube.

Hypercubes are said to have similar classifications when an action performed as a result of a classification in one hypercube is the same as the action performed as a result of classification in an other hypercube. For example, web sessions classified into two hypercubes corresponding to the premium and regular services may both get the same bandwidth during non peak hours. In this case, during non peak hours hypercubes corresponding to premium and regular services may be combined to obtain a bigger hypercube.

Subsequently, the hypercubes obtained in step 110 are assigned cost weights in step 120. Step 120 generally also includes the step of obtaining these cost weights. These cost weights can be obtained by employing a cost weight listing of costs of arbitrarily shaped regions. In particular embodiments, the cost weight of a hypercube can be obtained by considering the cost weight to be proportional to the volume of the hypercube which intersects with the given arbitrarily shaped regions. The cost weight of a hypercube is sometimes assigned according to a marginal weight distribution derived employing a cost weight listing by projecting the hypercube into some of the arbitrarily shaped regions. In some cases, cost weight is obtained: as the number of CPU cycles required to evaluate the hypercube, or as the known probability that an attribute of an object will fall within the hypercube, or as the fraction of total revenue generated by objects whose attributes fall in that hypercube. A hypercube's weight may or may not be known precisely prior to the process of constructing the search tree and may be determined during the ongoing act of classifying objects. Finally, in step 130 a search tree is constructed for cost conversant classification.

In some embodiments, in step 120 of FIG. 1, the cost weights associated with hypercubes may be obtained from the underlying set of rules as described in detail earlier in the embodiment. In many embodiments, this could be done by assigning cost for at least one hypercube according to a projection of said hypercube into at least one said arbitrarily shaped region. In some embodiments, this step may include employing cost weights of arbitrary shaped regions. In yet another embodiments, the cost weight to a hypercube may be assigned in proportion to a volume of said hypercube.

Figure 2:
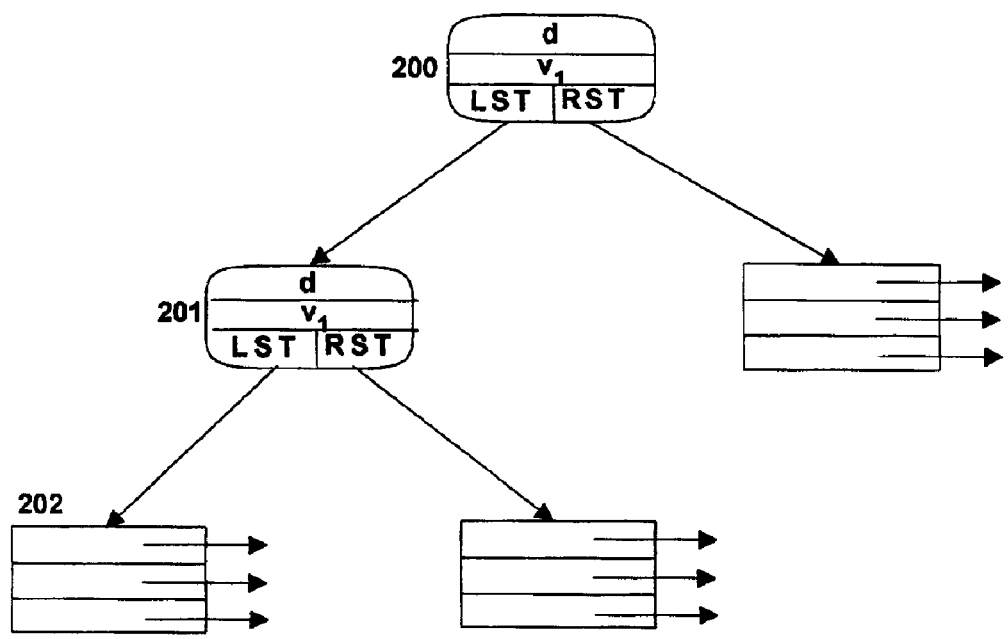
FIG. 2a illustrates an example search tree in accordance with the present invention.
FIG. 2b illustrates an example of an internal node.
FIG. 2c illustrates an example of a leaf node.

FIG. 2a shows an example illustration of a search tree 200. A search tree has intermediate 201 and leaf 202 nodes. FIG. 2b shows an example of an intermediate node 211. Each intermediate node includes a decision dimension 'd' and a splitting threshold 't'. It also includes pointers for the left and right sub-trees grafted at the intermediate node. FIG. 2c shows an example illustration of a leaf node 221. Each leaf node includes a candidate list comprising of a hypercube subset taken from the set of all hypercubes, one upper bound dimension list and one lower bound dimension list. The lists specify the dimensions along which the lower and upper boundaries of a candidate box must be checked to verify whether the given point belongs to that box.

Figure 3:
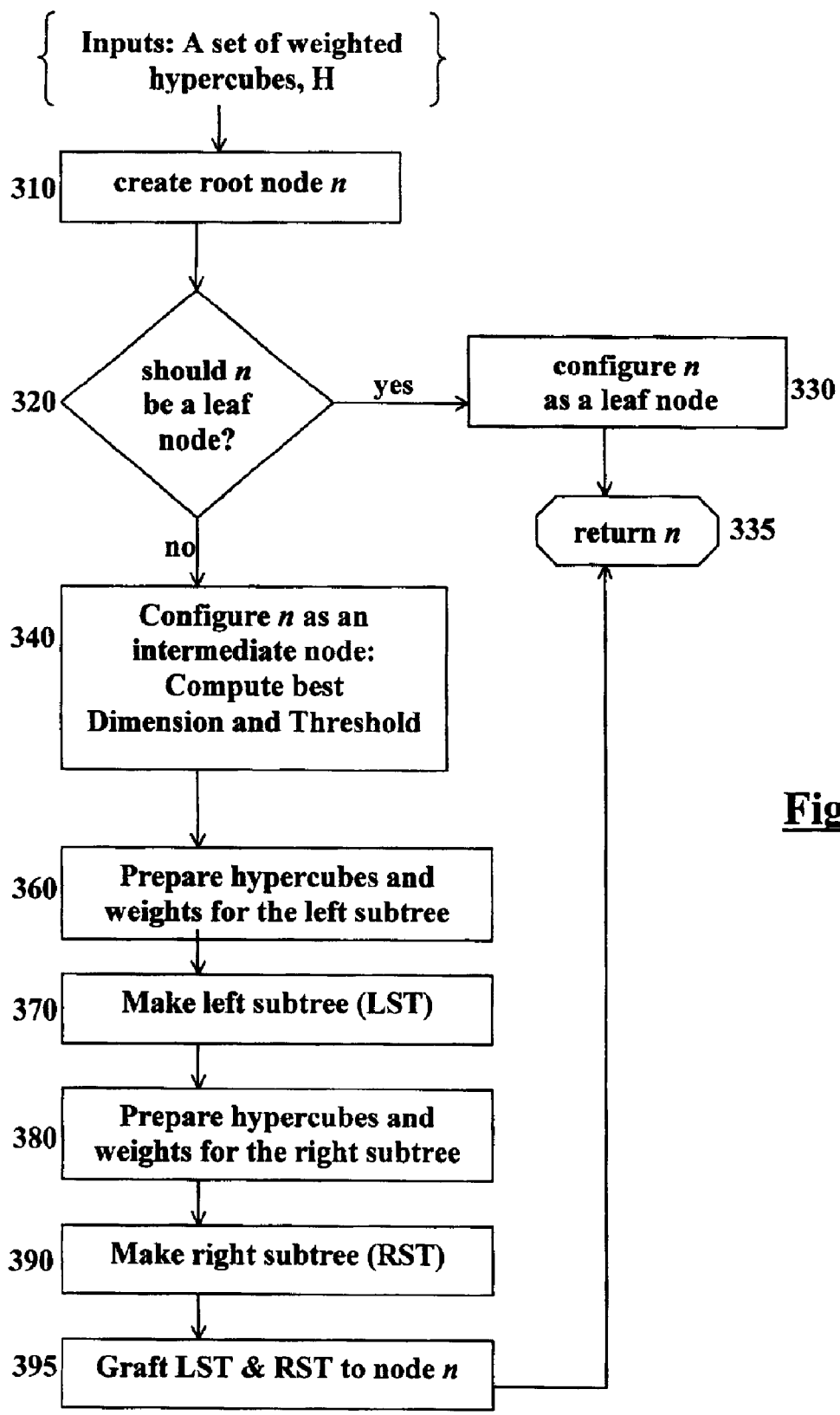
FIG. 3 illustrates an example flow diagram of a process of building a search tree for a given set of hypercubes and their associated weights.

FIG. 3 provides an overall example flow chart of the process of building a search tree for a set of weighted hypercubes 'H'. In the first step 310, a root node 'n' is created with the given set of hypercubes 'H' and their associated weights. In step 320, it is determined whether the node 'n' ought to be declared a leaf node based on a leaf node criterion. A node 'n' may be declared a leaf node if the number of rules in that node is relatively small. It may also be declared a leaf node if its distance from the root node of the tree exceeds a certain specified limit 'D'. It may also be declared a leaf node if a comparison shows that there is a good tradeoff between the number of rules in the node and the distance of the node from the root node. These are some examples of the leaf node criterion.

If node 'n' is labeled as a leaf node in step 320, then 'n' is configured as a leaf node in step 330 and the process stops. The process of configuring a leaf node is further illustrated in FIG. 2c. If node 'n' is labeled as an interior node in step 320, then 'n' is configured as an interior node in step 340. Node 'n' is split in step 340, and as a result left and right child nodes of the intermediate node are constructed in step 370 and step 390. The splitting of intermediate node is based on a predicted future cost weight of these child sub-trees. This is done by determining a best decision dimension 'd' and a splitting threshold 't' for each intermediate node. In the step of constructing left and right child nodes, a decision dimension 'd' can be found independently of the splitting threshold 't'. Flow diagrams of the details of step 340 are given in FIG. 4, FIG. 5, and FIG. 6.

In order to construct the left child sub-tree, in step 360, LCR, a subset of intermediate node hypercubes are assigned to the left child node. This assignment uses a decision dimension and a splitting threshold found in step 340 and includes a comparison of the boundaries of each intermediate node hypercube. In the comparison, a hypercube associated with node 'n' belongs to the set LCR if its range of selector attributes in the dimension 'd' has a lower-limit less than or equal to the splitting threshold 't'. In step 370 a left search sub-tree (LST) is created using the hypercubes in LCR. FIG. 3 illustrates an example flow chart for the process of creating the left search sub-tree.

In order to construct the right child sub-tree, in step 380, RCR, a subset of intermediate node hypercubes are assigned to the right child node. The set of rules for the right child node of 'n' is obtained in that a hypercube associated with node 'n' belongs to the set RCR if its range of selector attributes in the dimension 'd' has an upper limit greater than the splitting threshold 't'. In step 390 a right search sub-tree (RST) is created using the hypercubes in RCR. In step 395, search sub-trees LST and RST are grafted to the node 'n' (as left and right children, respectively) to complete the construction of the search tree by putting a pointer to the left and right child node in the intermediate node as shown in FIG. 2b.

As illustrated in step 320 of FIG. 3, the method for building search tree includes declaring a node under examination to be a leaf node based on a leaf node criterion. In some embodiments, the step of declaring a next node to be leaf node includes computing for said next node a total number of rules and comparing said total number of rules to a depth of said next node.

As shown in FIG. 2b, and step 395 of FIG. 3, the step of splitting intermediate tree node includes constructing left and right child nodes of the intermediate node. In some embodiment, this includes assigning a subset of intermediate node hypercubes to each said child node as shown in step 380 of FIG. 3.

Recall that during the search tree construction, we need to partition an interior node by creating two child sub-trees. The choice of decision dimension on which to partition the node is a critical one and it involves finding a dimension with a high level of uncertainty or high level of future potential cost weight.

Figure 4:
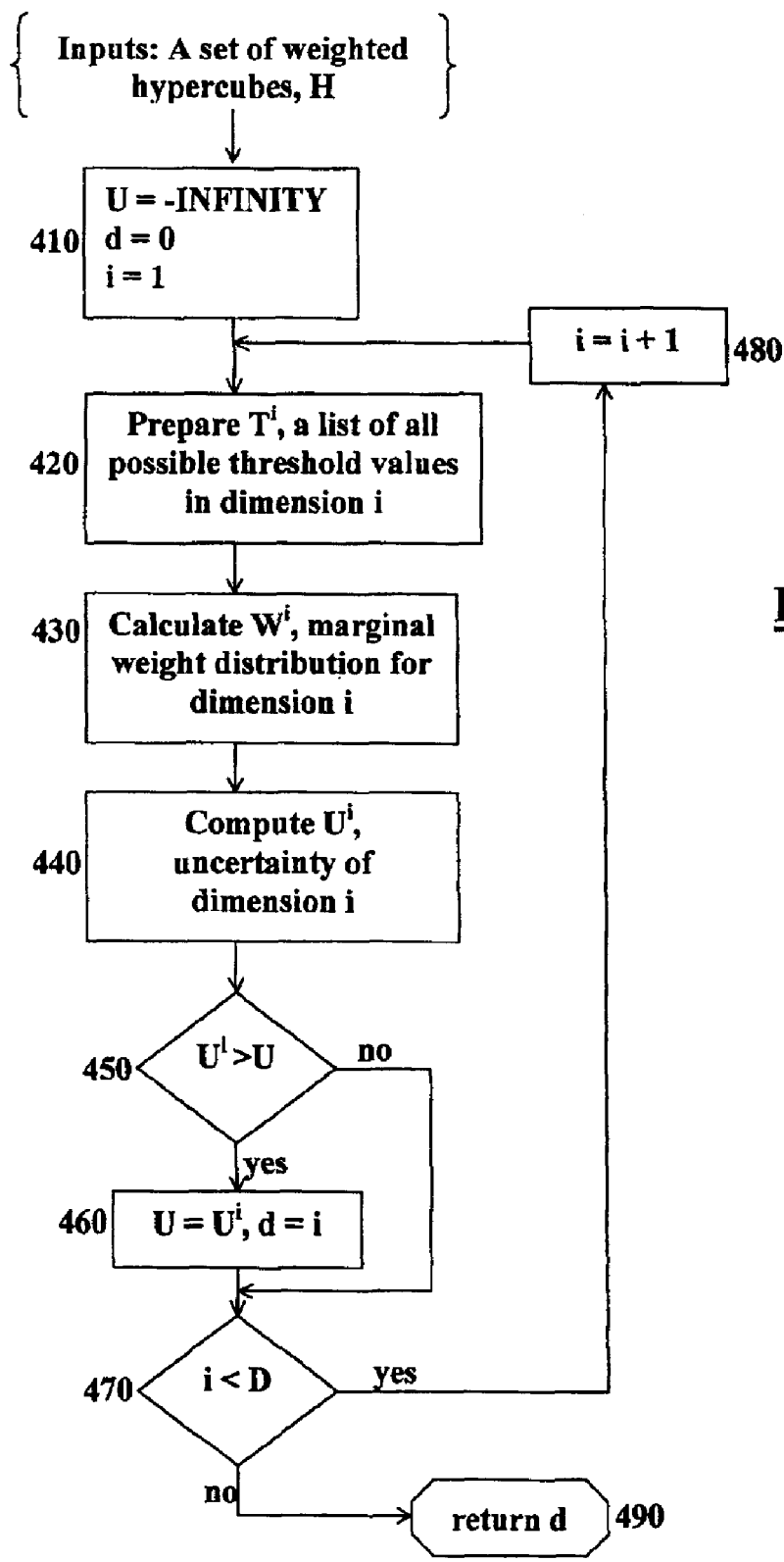
FIG. 4 illustrates an example flow diagram of the process of finding the best dimension to split an internal node.

FIG. 4 shows an example flow chart for the process of determining the best dimension on which to partition an interior node. This process maintains two variables: (1) 'd', the best dimension found thus far (2) 'U', a performance metric. We start the process in step 410 with 'd' set to 0 and 'U' set to minus infinity. A pointer 'i', which points to the current dimension under consideration, is initialized to 1. In step 420, we prepare a list $T_i$ of all possible threshold values in dimension 'i'. For example, this list could be any of the following:

1. A list of all lower and upper limits of the range corresponding to dimension i, for all hypercubes associated with this node.
2. Any subset of such set.

In Step 430, we compute a list of marginal weights $W_i$ for the dimension 'i'. The marginal weight $W_i$ is computed relative to the partition of the dimension 'i' created by the list of threshold values $T_i$, where the marginal weight and partition of a dimension are defined as discussed earlier. Next, in Step 440, we compute the uncertainty $U_i$ of dimension 'i' from the marginal weight distribution $W_i$. The uncertainty is a measure of how uniformly the cost weights are distributed among different intervals of the partition under consideration. For example, computing uncertainty may include computing an entropy for dimension 'i'. The entropy may be computed from a marginal weight distribution as follows:

$$U_i = -(\Sigma w_j \log w_j)/(\Sigma w_k) + \log \Sigma w_j$$

where $W_j$ is a weight in the marginal weight distribution $W_i$ and all summations in the above equation are over all weights in this marginal weight distribution. If entropy is chosen as a measure of uncertainty then it would result in choosing the dimension with highest entropy as the decision dimension.

In Step 450, the uncertainty $U_i$ of the current dimension 'i' is compared to the value 'U'. If $U_i > $'U', then step 460 is taken which sets 'U' to the value of $U_i$ and 'd' to the value of 'i'. If $U_i \leq U$, then processing continues with step 470.

Step 470, determines if all dimensions have been evaluated or not. If 'i'<'d', then 'i' is incremented by 1 in step 480 and the process continues with Step 420. If 'i'≧'d', (implying that all dimensions have been evaluated) processing ends with step 490 where the value of 'd' is declared as the best decision dimension on which to partition node 'n'.

Figure 5:
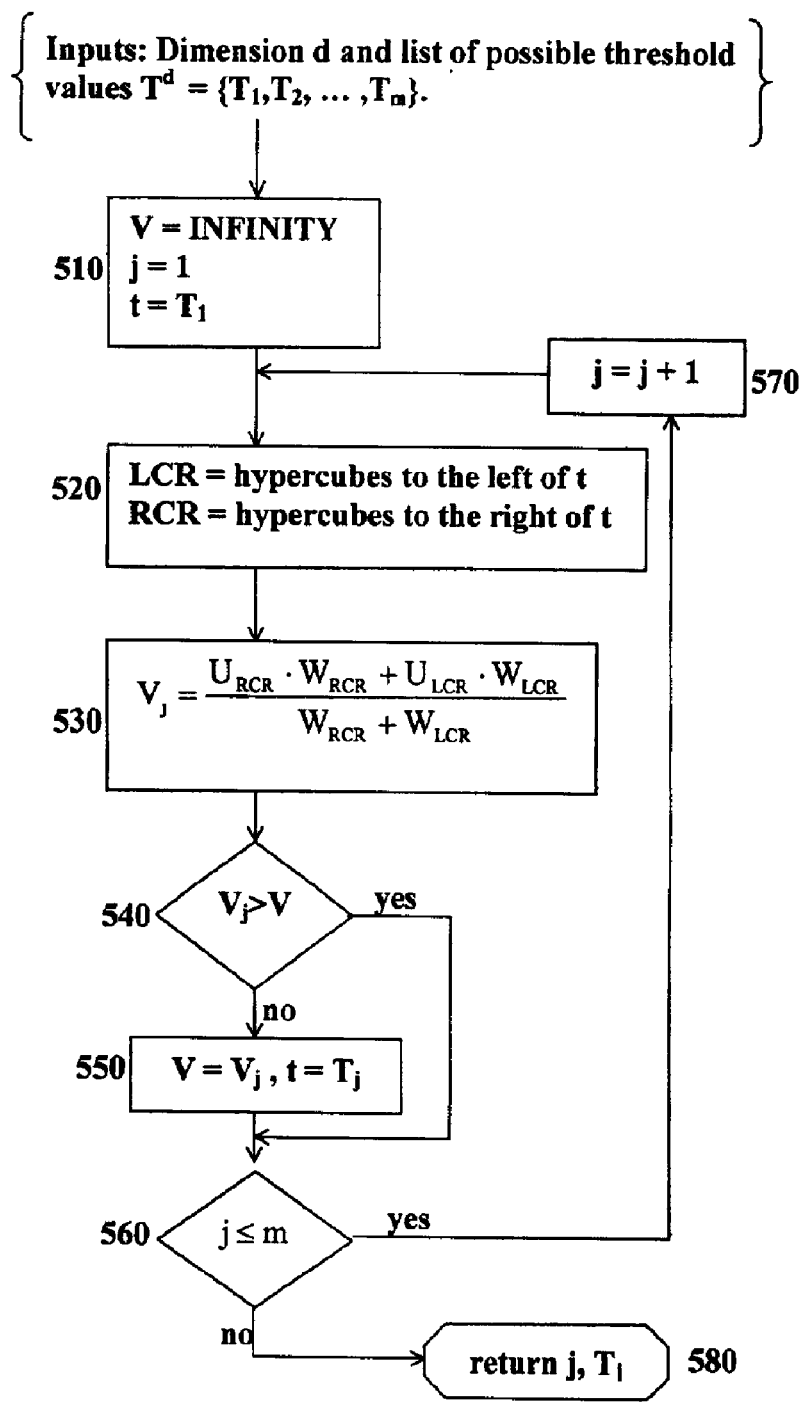
FIG. 5 illustrates an example flow diagram of the process of finding the best threshold in a given dimension to split an internal node.

FIG. 5 shows an example flow diagram for the process of finding the best threshold for partitioning an interior node 'n'. The inputs to this process are the decision dimension 'd' found as described above, and a list $T^d = \{T_1, T_2, T_3, \ldots, T_m\}$ of candidate thresholds. For example, this list could be any of the following:

1. A list of all lower and upper limits of the range corresponding to dimension 'd', for all hypercubes associated with this node.
2. Any subset of such set.

In the initialization step 510, a variable 'V' is initialized to infinity and splitting threshold 't' is set to $T_1$. The current threshold index 'j' is set to 1. In step 520 the hypercubes associated with the interior node are divided into two sets: LCR and RCR. A hypercube 'H' belongs to LCR if the lower-limit of the range of 'H' in dimension 'd' is less than or equal to 't'. Similarly, a hypercube 'H' belongs to RCR if the upper limit of the range of 'H' in dimension 'd' is greater than 't'.

In step 530 the expected future uncertainty $V_j$ of the resulting sub-trees is computed. This is equivalent to computing the predicted future cost weight of child sub-trees. One example of computing this uncertainty or the predicted future cost weight is as follows:

$$V_j = (U_{RCR} \cdot W_{RCR} + U_{LCR} \cdot W_{LCR})/(W_{RCR} + W_{LCR})$$

Here $U_{RCR}$ and $U_{LCR}$ are the uncertainties of the RCR and LCR respectively, and can be computed by using the formula described earlier. Similarly $W_{RCR}$ and $W_{LCR}$ are the sum of weights of hypercubes in RCR and LCR, respectively.

If in step 540 the expected uncertainty $V_j$ is not greater than the value of the variable 'V', then step 550 is taken and the value of 'V' is set to $V_j$ and 't' is set to $T_j$.

In Step 560, a determination is made as to whether all thresholds in 't' have been evaluated or not. If all thresholds have not been evaluated then step 570 increases the value of the threshold index by one and processing continues with step 520, else the processing halts and the value of threshold index 'j' and threshold $T_j$ is returned in the final step 580.

It is noted that FIG. 5 only shows an example flow diagram. In another example embodiment, the threshold 't' is chosen so that the weights of RCR and LCR are balanced.

Figure 6:
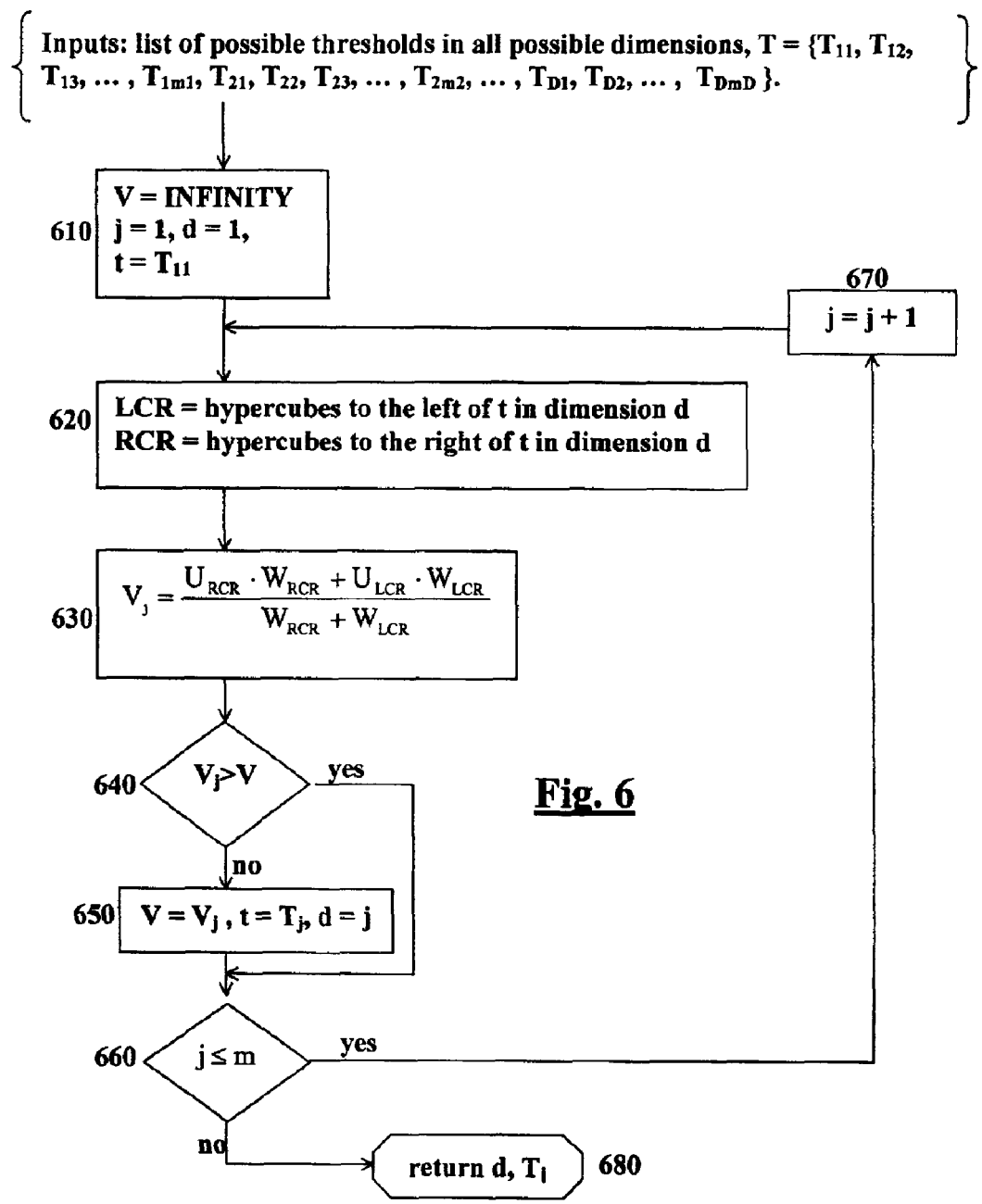
FIG. 6 illustrates an example flow diagram of the process of finding the best threshold and the best dimension to split an internal node.

FIG. 6 shows an example flow diagram for the process of simultaneously finding the best decision dimension and the best splitting threshold for partitioning an interior node 'n'. The best decision dimension and the best splitting threshold project a lowest future uncertainty among all possible choices of dimensions and thresholds. This is a single process, as opposed to the two separate processes outlined in FIG. 4 and FIG. 5. The input to the process is a set $T = \{T_{11}, T_{12}, T_{13}, \ldots, T_{1m1}, T_{21}, T_{22}, T_{23}, \ldots, T_{2m2}, \ldots, \ldots, T_{D1}, T_{D2}, \ldots, T_{DmD}\}$ of all possible threshold values in all 'D' dimensions. This list can be obtained by going through all dimensions and using lower and upper limits of the ranges of all hypercubes under consideration. Let $m = m_1 + m_2 + m_3 + \ldots + m_D$ be the total number of thresholds in the list 'T'. Let $T_1, \ldots, T_m$ be an alternative notation for the threshold values in the list 'T'.

In the initialization step 610, a variable 'V' is set to infinity and the current threshold index 'j' is set to 1. A dimension variable 'd' is initialized to 1 and the threshold 't' is set to $T_{11}$.

In step 620 the hypercubes associated with the interior node are divided into two sets: LCR and RCR. A hypercube 'H' belongs to LCR if the lower limit of the range of 'H' in dimension 'd' is less than or equal to 't'. Similarly, a hypercube 'H' belongs to RCR if the upper limit of the range of 'H' in dimension 'd' is greater than 't'.

In step 630 the predicted future cost weight of child sub-trees or the expected uncertainty $V_j$ of the resulting child node is computed as follows:

$$V_j = (U_{RCR} \cdot W_{RCR} + U_{LCR} \cdot W_{LCR})/(W_{RCR} + W_{LCR})$$

In step 640, if the expected uncertainty $V_j$ is not greater than the value of the variable 'V', then step 650 is taken and the value of 'V' is set to $V_j$ and 't' is set to $T_j$. The dimension variable 'd' is set to the dimension in which the current index 'j' points to.

In step 660, a determination is made as to whether all thresholds in 'T' have been evaluated or not. If all thresholds have not been evaluated then step 670 increases the threshold index by one and processing continues with step 620, else processing halts and dimension 'd' along with threshold $T_j$ are returned in the final Step 690.

Figure 7:
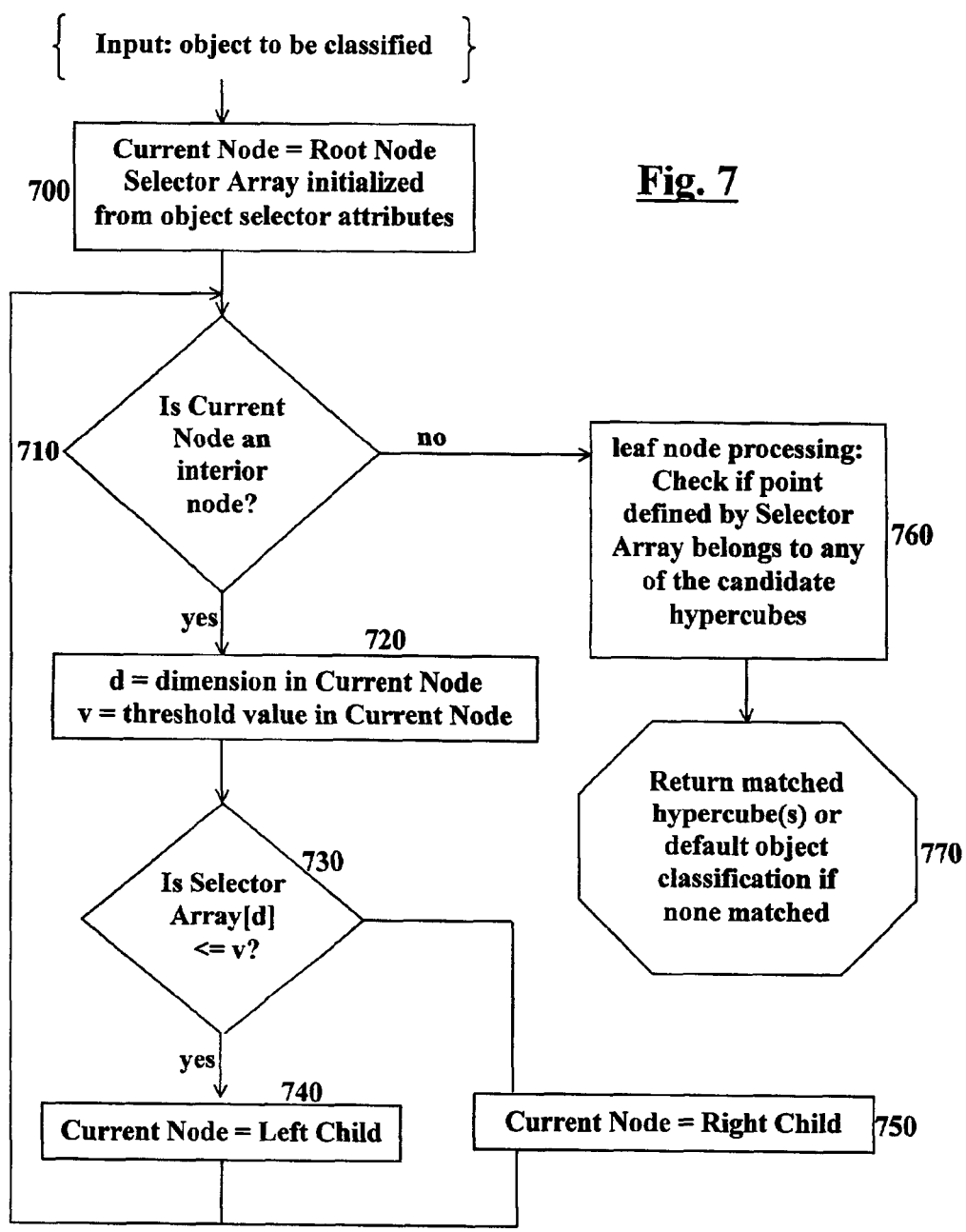
FIG. 7 illustrates an example flow diagram of a process of finding all rules that a given object satisfies.

FIG. 7 is an example flow chart of the process of finding all rules that are satisfied by an object. Given a point $p = (P_1, \ldots, P_D)$ in D-dimensional space, the search tree is traversed to determine all the hypercubes that contain p. If no match is found, then a default object classification is returned.

In an example embodiment of the invention, a search method follows the steps shown in FIG. 7. The search begins at the root node by assigning Current Node to the Root Node in the initialization step 700. This step also initializes Selector array with values from the object's selector attributes to represent it as a point in the D-dimensional space. The first step in each iteration is the comparison 710, which determines if the current node is an interior node or a leaf node. If it is an interior node, the search proceeds to step 720 which assigns to d the dimension number stored in the current node and to v the threshold value from the current node. Next, the comparison of step 730 checks if the value of $d^{th}$ attribute in the selector array associated with the object is at least as large as the value v obtained in step 720. If so, the left child of the Current Node is made the new Current Node in step 740, otherwise, the right child is made the new Current Node in step 750. In either case, the search proceeds to begin another iteration with the comparison in step 710. Such iterations end when the result of comparison in 710 indicates that the Current Node is a leaf node. In this case, processing leads to the final step of 760, where each of the candidate hypercubes in the leaf node are tested for applicability for the current object.

This testing generally involves the following detailed sub-steps: If the list of candidate hypercubes stored in the leaf node is empty, then search terminates without finding a match. The default object classification is returned. If it is not empty, each of the candidate hypercubes in the candidate list is considered for applicability, one by one. The applicability test for each hypercube is aided by the two lists of dimensions associated with each candidate hypercube. These are examined as follows. Let $W = <[L_1, U_1], [L_2, U_2], \ldots, [L_D, U_D],>$ denote a candidate hypercube. Here, $L_i$ and $U_i$ represent the lower and the upper bounds of the range in the $i^{th}$ dimension used to specify the hypercube. The given point p belongs to hypercube W if both of the following conditions hold:

i. For each dimension d in the upper bound dimension list associated with W, Selector Array[d] $<= U_d$ holds.

For each dimension d in the lower bound dimension list associated with W, Selector Array[d] $>= L_d$ holds.

If none of the hypercubes in the candidate list meets the above conditions then search terminates without finding a match then the default object classification is returned.

As illustrated in FIG. 7, a further aspect of this invention is to employ the search tree for classifying the object. Thus, in a particular embodiment, the step of assigning a subset of intermediate node hypercubes includes finding a decision dimension and a splitting threshold for the intermediate node and comparing the boundaries of said hypercubes in the decision dimension to the splitting threshold. This is shown in step 340 of FIG. 3. Some embodiments may first find a decision dimension as shown for example in FIG. 4, followed by finding a splitting threshold in the decision dimension as shown for example in FIG. 5.

The step of finding a decision dimension includes locating a dimension with a high level of uncertainty. This may further include computing an entropy for each dimension and choosing as the particular dimension a dimension having a highest entropy. The step of computing entropy may further include finding possible splitting thresholds in the dimension. In some embodiments, the step of computing an entropy includes calculating a marginal weight distribution for each dimension.

As discussed earlier, in some embodiments the step of computing splitting threshold includes finding possible splitting threshold values in each dimension. Sometimes, a splitting threshold is found by computing expected future uncertainty for each possible splitting threshold values and choosing a threshold which has lowest future uncertainty.

In some embodiments, the intermediate node is split by computing expected future uncertainty which includes the step of computing a weighted average of the uncertainty for left and right child nodes. Some embodiments may choose decision dimension and splitting thresholds by considering future uncertainty among all possible choices of dimensions and thresholds and by choosing a dimension and a threshold which project the lowest cost.

Figure 8:
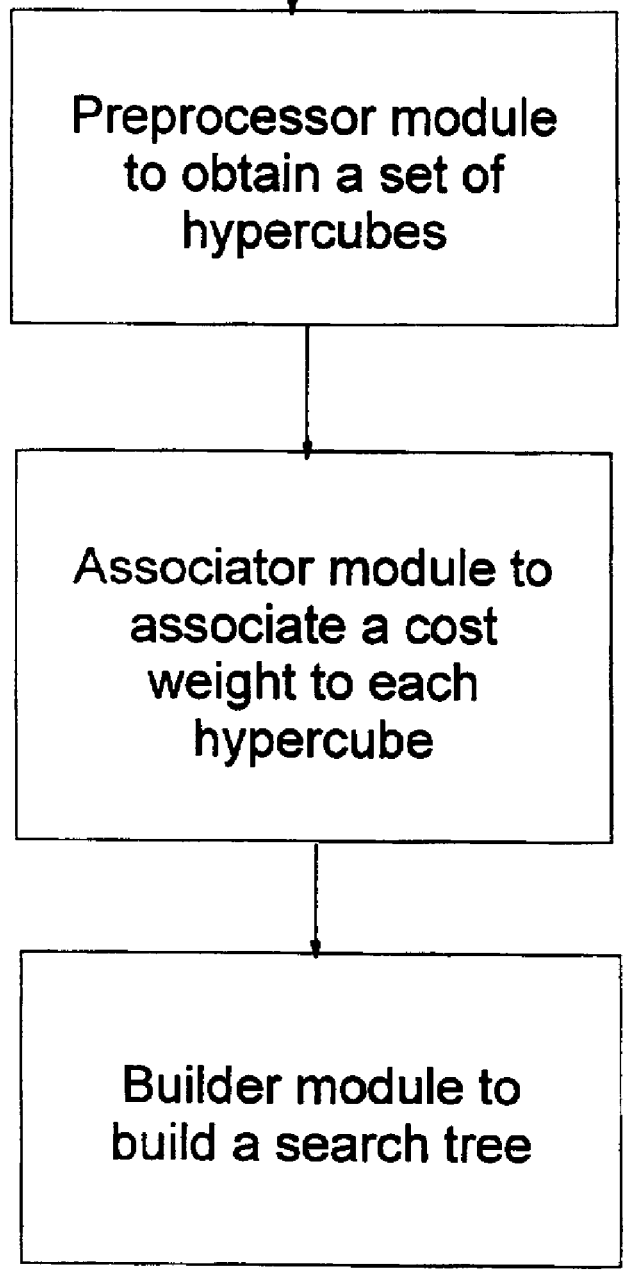
FIG. 8 is an example illustration of an apparatus for building a search tree based on the predicted future cost weight of child sub-trees within the search tree.

FIG. 8 is an example embodiment of an apparatus for building a search tree for a set of rules. It includes a preprocessor 810 for obtaining a set of hypercubes from the set of rules. In also has an associator 820 for assigning cost weights to the set of hypercubes. Finally, the builder module 830 builds a search tree based on a predicted future cost weight of child sub-trees within said search tree. Often, the builder modules includes a decision maker to declare the next node to be a leaf node and a splitter module which splits intermediate nodes. The splitter module includes a locator to locate a possible dimension and a threshold to split an intermediate node. In order to locate these, the locator uses a calculator to calculate uncertainties and entropies.

Thus the present invention provides an apparatus including: a preprocessor 810 to obtain a set of hypercubes representing a set of rules for an object; an associator 820 to associate a cost weight for each hypercube in the set of hypercubes; and a builder module 830 to build a search tree for the set of hypercubes by splitting intermediate tree nodes of the search tree based on a predicted future cost weight of child sub-trees within the search tree, wherein each node in the search tree includes a hypercube subset taken from the set of hypercubes, a decision dimension, and a splitting threshold.

In some embodiments the apparatus also includes a classifier module to classify objects; and/or the builder module includes a decision maker to declare a next node to be a leaf node based on a comparison of a total number of rules in the next node with a depth of the next node; and/or the builder module includes a splitter module to determine a decision dimension and a splitting threshold for the intermediate nodes; and/or the splitter module includes a locator to locate a decision dimension with a high level of uncertainty; and/or the locator includes a calculator to calculate an entropy for each attribute dimension and to choose the attribute dimension having a highest entropy as the decision dimension; and/or the calculator calculates a weighted average of the expected uncertainty for each possible splitting threshold values in the decision dimension and chooses a threshold which has a lowest weighted average as the splitting threshold; and/or the locator includes a calculator to choose the decision dimension and splitting threshold as a particular dimension and particular threshold that project lowest future uncertainty among available choices of dimensions and thresholds.

It is noted that present invention can be realized in hardware, software, or a combination of hardware and software. The present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when loaded and executed, controls the computer system such that it carries out the methods described herein. The present invention can also be embedded in a computer program product, which comprises the features enabling the implementation of the methods described herein, and which—when loaded in a computer system—is able to carry out these methods.

Computer program means or computer program in the present context includes any expression, in any language, code or notation, of a set of instructions intended to cause a system having an information processing capability to perform a particular function either directly or after conversion to another language, code or notation, and/or reproduction in a different material form.

Thus the invention includes an article of manufacture comprising a computer usable medium having computer readable program code means embodied therein for causing a function described above. The computer readable program code means in the article of manufacture comprising computer readable program code means for causing a computer to effect the steps of a method of this invention.

Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention.

Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A computer implemented method object classification comprising:

obtaining a set of hypercubes, which comprise a D-tuple of ranges <$[L_1\ U_1], [L_2\ U_2], \ldots [L_D\ U_D]$,> that define a subspace within the D-dimensional space, said hypercubes representing a set of rules for said object, said object being an entity that is abstract, virtual, physical and/or real that has a vector of 'D' selector attributes;

associating a cost weight for each hypercube in said set of hypercubes, said cost weight representing the cost weight of a region in D-dimensional space; and building a search tree which is an abstract graph structure having nodes and links for said set of hypercubes by splitting intermediate tree nodes of said search based on a predicted future cost weight of child sub-trees within said search tree, wherein each node in said search tree includes a decision dimension and a splitting threshold.

2. A method as recited in claim 1, wherein the step of obtaining a set of hypercubes includes decomposing a region in a multidimensional space into at least one hypercube.

3. A method as recited in claim 1, wherein the step of obtaining a set of hypercubes includes combining hypercubes which result in a similar classification into a bigger hypercube.

4. A method as recited in claim 1, further comprising employing said search tree for classifying said object.

5. A method as recited in claim 1, wherein the step of associating includes obtaining said cost weights.

6. A method as recited in claim 5, wherein the step of obtaining said cost weights includes employing a cost weight listing of costs of arbitrarily shaped regions.

7. A method as recited in claim 6, wherein the step of employing a cost weight listing includes assigning cost for at least one hypercube in proportion to a volume of said at least one hypercube.

8. A method as recited in claim 6, wherein the step of employing a cost weight listing includes assigning cost for at least one hypercube according to a projection of said hypercube into at least one of said arbitrarily shaped regions.

9. A method as recited in claim 1, wherein the step of building includes declaring a next node to be a leaf node based on a leaf node criterion.

10. A method as recited in claim 9, wherein the step of declaring a next node to be a leaf node includes computing for said next node a total number of rules and comparing said total number of rules to a depth of said next node.

11. A method as recited in claim 1, wherein the step of splitting intermediate tree nodes includes constructing left and right child nodes of each intermediate node.

12. A method as recited in claim 1, wherein the step of splitting intermediate tree nodes includes constructing left and right child nodes of each intermediate node.

13. A method as recited in claim 12, wherein the step of assigning a subset of intermediate node hypercubes includes finding a decision dimension and a splitting threshold for the intermediate node and comparing the boundaries of said hypercubes in said decision dimension to said splitting threshold.

14. A method as recited in claim 11, wherein the step of constructing left and right child nodes includes finding a decision dimension for each intermediate node.

15. A method as recited in claim 11, wherein the step of constructing left and right child nodes includes finding a splitting threshold for each intermediate node.

16. A method as recited in claim 14, wherein the step of finding a decision dimension includes locating a dimension with a high level of uncertainty.

17. A method as recited in claim 16, wherein the step of locating a dimension with a high level of uncertainty includes computing an entropy for each dimension and choosing as a particular dimension a dimension having a highest entropy.

18. A method as recited in claim 17, wherein the step of computing an entropy for each dimension includes finding possible splitting thresholds in the dimension.

19. A method as recited in claim 17, wherein the step of wherein the step of computing an entropy includes calculating a marginal weight distribution for each dimension.

20. A method as recited in claim 15, wherein the step of finding a splitting threshold includes finding possible threshold values in each dimension.

21. A method as recited in claim 15, wherein the step of finding a splitting threshold includes computing expected future uncertainty for each possible threshold values and choosing a threshold which has lowest future uncertainty.

22. A method as recited in claim 21, wherein the step of computing expected future uncertainty includes the step of computing a weighted average the uncertainty for left and right child nodes.

23. A method as recited in claim 13, wherein the step of choosing decision dimension and splitting threshold involves choosing a dimension and threshold which projects lowest future uncertainty among all possible choices of dimensions and thresholds.

24. an article of manufacture comprising a computer usable medium having computer readable program code means in said article of manufacture comprising computer readable program code means for causing a computer to effect the steps claim 1.

25. An apparatus comprising:
a preprocessor to obtain a set of hypercubes which comprise a D-tuple of ranges <$[L_1\ U_1], [L_2\ U_2], \ldots [L_D\ U_D],$> that define a subspace within the D-dimensional space, said hypercubes representing a set of rules for an object, said object being an entity that is abstract virtual, physical and/or real that has a vector of 'D' selector attributes;
an associator to associate a cost weight for each hypercube in said set of hypercubes said cost weight representing the cost weight of a region in D-dimension space;
a builder module to build a search tree which is an abstract graph structure having nodes and links, for said set of hypercubes by splitting intermediate tree nodes of said search tree based on a predicted future cost weight of child sub-trees within said tree, wherein each node in said search tree includes a hypercube subset taken from said set of hypercubes, a decision dimension, and a splitting threshold.

26. An apparatus as recited in claim 25, further comprising a classifier module to classify objects.

27. An apparatus as recited in claim 25, wherein the builder module includes a decision maker to declare a next node to be a leaf node based on a comparison of a total number of rules in the next node with a depth of said next node.

28. An apparatus as recited in claim 25, wherein the builder module includes a splitter module to determine a decision dimension and a splitting threshold for said intermediate nodes.

29. An apparatus as recited in claim 28, wherein the splitter module includes a locator to locate a decision dimension with a high level of uncertainty.

30. An apparatus as recited in claim 29, wherein the locator includes a calculator to calculate an entropy for each attribute dimension having a highest entropy as the decision dimension.

31. An apparatus as recited in claim 30, wherein the calculator calculates a weighted average of the expected uncertainty for each possible splitting threshold values in said decision dimension and chooses a threshold which has a lowest weighted average as the splitting threshold.

32. An apparatus as recited in claim 29, wherein the locator includes a calculator to choose the decision dimension and splitting threshold as a particular dimension and particular threshold that project lowest future uncertainty among available choices of dimensions and thresholds.

33. A computer program product comprising a computer usable medium having computer readable program code means in said article of manufacture comprising computer readable program code means embodied therein for causing object classification, the computer readable program code means in said computer program product comprising computer readable code means for causing a computer to effect the functions of claim 25.

34. A program storage device readable by machine, tangibly embodying a program of instructions executable by the machine to perform method steps for object classification, said method steps comprising the steps of claim 1.

* * * * *